W. SPENCER.
HEATING ATTACHMENT FOR STOVES.
APPLICATION FILED APR. 26, 1916.
1,190,335.
Patented July 11, 1916.
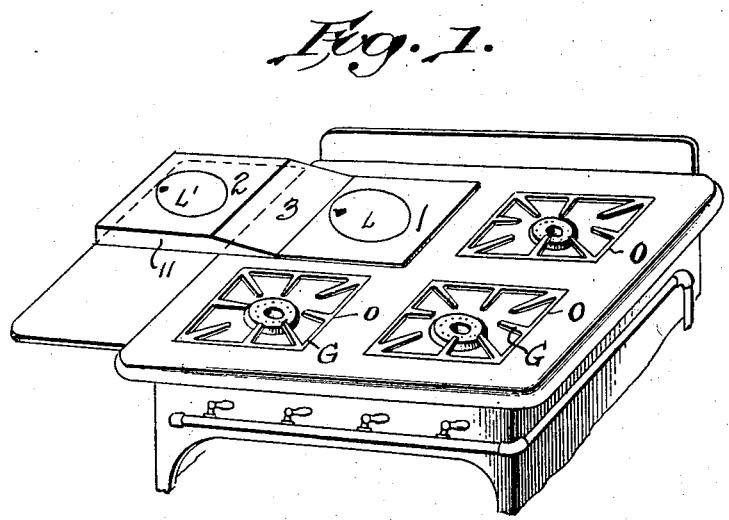
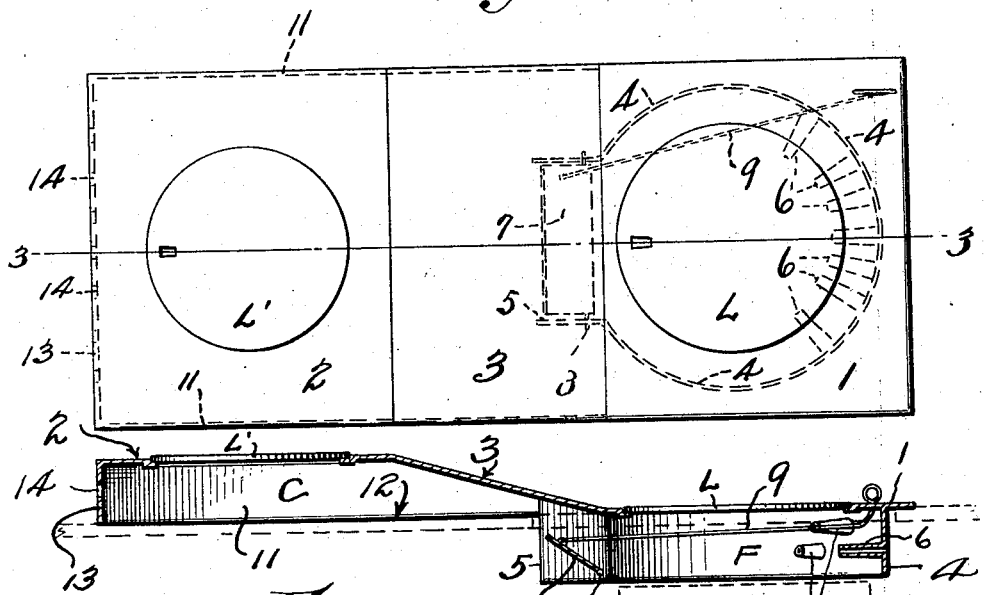
William Spencer

UNITED STATES PATENT OFFICE.

WILLIAM SPENCER, OF PHILADELPHIA, PENNSYLVANIA.

HEATING ATTACHMENT FOR STOVES.

1,190,335.

Specification of Letters Patent.

Patented July 11, 1916.

Application filed April 26, 1916. Serial No. 93,746.

*To all whom it may concern:*

Be it known that I, WILLIAM SPENCER, a citizen of the United States, residing at Philadelphia, in the county of Philadelphia and State of Pennsylvania, have invented certain new and useful Improvements in Heating Attachments for Stoves, of which the following is a specification.

This invention relates to heating appliances, and has special reference to a novel improvement in attachments for use in connection with gas stoves, whereby the heat of a single gas burner may be utilized to heat more than one vessel or utensil.

A primary object of the invention is to provide a device which has heating surfaces disposed at different levels, whereby one surface may be heated direct by contact with the flame, while another is heated indirectly by excess heat given off by the flame, and also from the first mentioned heating surface. Therefore, the invention provides two heating surfaces from one flame, thus, utilizing the heat therefrom that would otherwise be wasted, for cooking or warming purposes.

A further object of the invention is to provide a simple and substantial construction that may be easily and economically manufactured, and which involves special features of construction for controlling and directing the heat from a flame to the indirectly heated portion of the device.

With the above and other objects in view which will more readily appear as the nature of the invention is better understood, the invention consists in the novel construction, combination, and arrangement of parts hereinafter more fully described, illustrated and claimed.

A preferred and practical embodiment of the invention is shown in the accompanying drawings, in which—

Figure 1 is a perspective view of the top of a gas stove showing one application of the invention. Fig. 2 is a top plan view of the invention. Fig. 3 is a longitudinal sectional view on the line 3—3 of Fig. 2.

Similar reference numerals designate corresponding parts throughout the several figures of the drawings.

As previously indicated the invention has in view a device which has heating surfaces arranged at different levels, that is one heating surface lying in substantially the same plane as the top of the gas stove, while another portion thereof presents an offset heating surface lying in a higher plane to receive the excess or waste heat, when desired, from the first heating surface which is usually in direct contact with a flame. Accordingly, to this end, the invention has in view, a heating top comprising a supporting body having a directly heated plate member 1, and an indirectly heated plate member 2, respectively arranged at different levels, and being connected by an inclined heat deflecting wall 3. The said directly heated plate member 1 is adapted to fit over and cover the usual burner opening O in the gas stove top after the utensil supporting grating G has been removed, thus being positioned directly above the burner element B. Although this plate member 1 entirely shields the burner element B when placed in position on the top of a stove, the direct heat of the flame from the burner B may be utilized by removing the lid L from its conventional recessed support in the plate member. Like the plate 1, the plate 2 is provided with a removable lid L', which may be lifted out of its recessed seat when desired to expose the vessel or utensil to a greater heat.

In connection with the directly heated plate member 1, it will be observed that the same preferably carries on its underside a suitable depending flame enveloping flange 4, which, as shown in the drawings, may be circular and provided at a point beneath the inclined heat deflecting wall 3 with a constricted heat conducting outlet 5. This depending flame enveloping flange 4 is so arranged that it entirely encompasses the burner element B, to thereby concentrate and collect all of the flame therefrom to heat the plate member 1, and also provides a flame chamber F. In order to increase the process of combustion in the flame chamber F and intensify the heat from the burner element B, the flange member 4 is preferably provided with a plurality of air nozzles 6 arranged in an upper and lower series and projecting radially toward the axis of the flame chamber F. These air nozzles 6 are of such a length that they extend well into the flame chamber to be in direct contact with the flame from the burner element B, whereby air drawn through the same will be highly heated by the time it reaches the flame, thus materially assisting the process of combustion.

The constricted heat conducting outlet 5 of the flange 4 is preferably controlled by means of a damper valve 7, pivoted as at 8 in the lower part of the walls of the outlet section, and having a suitable operating connection 9, whereby the same may be manually raised and lowered to open and close the flame chamber F. When the flame chamber F is closed by the damper valve being in a vertical position, as indicated by the dotted lines in Fig. 3, substantially all of the heat will be retained in the flame chamber F to make the plate member 1 intensely hot. However, when the damper is open, as shown in full lines in Fig. 3, the heat is permitted to escape from the flame chamber F and thereby make its exit from the outlet 5, from whence it will rise and strike the lower face of the inclined heat deflecting wall 3, and thus be fed into the heat retarding chamber C beneath the indirectly heated plate 2. The said chamber C beneath the indirectly heated plate 2 is formed by means of the opposite side walls 11, the lower edge 12 of which is preferably in the same plane as the under face of the plate member 1. These walls 11 extend from the junction of the plate 1 with the wall 3 clear back to the end of the plate member 2, and at this latter point are connected by means of a transverse end wall 13 which is provided with a plurality of draft openings 14. With this arrangement of parts it will be apparent that when the damper valve 7 is open, as shown in Fig. 3, and a flame is emitted by the burner element B, the plate member 1 will be directly heated by the flame, while all excess heat from the flame chamber F will be drawn into the heat retarding chamber C on account of the draft established through the air nozzles 6 and heat conducting outlet 5, by means of the draft openings 14 at one end of the heat retarding chamber.

Although the invention is shown in Fig. 1 as being applied to a rear burner of a gas stove, with the indirectly heated plate member 1 resting on the shelf or ledge at one side of the top of the stove, it will, of course, be understood that the invention can be utilized in connection with other burners on the top of the stove, and the plate member 2 placed in any desired position. That is to say, regardless of the position of the device and in all uses of the invention, the heat from the flame chamber F beneath the plate member 1, will be conducted to the chamber C beneath the indirectly heated plate 2 on account of the inclined heat deflecting wall 3 which connects the said plate members respectively arranged at different levels. This construction and arrangement thus provides a supporting body for vessels or cooking utensils which has chambered offset heating units which communicate with each other and are disposed at different levels, the chamber F being the primary heating source, and the chamber C being arranged at one side of the latter and receiving the excess heat therefrom. In this connection, it may be noted that the invention is not limited in its application to a gas stove burner, but may be used in connection with a coal range in which case the depending flange 4 merely fits down into the fire box through the lid opening to receive the heat direct from the bed of coals.

Without further description, it is thought that the many features and advantages of the invention will be readily apparent, and it will, of course, be understood that various changes in the form, proportion, and minor details of construction may be resorted to without departing from the spirit of the invention or scope of the appended claims.

I claim:

1. A heating attachment for stoves comprising a directly heated plate, an indirectly heated plate arranged at a higher level than said directly heated plate, a flange depending from said directly heated plate and forming a chamber having an outlet, and flanges depending from said indirectly heated plate and forming a chamber in communication with the outlet of said first mentioned chamber, said flanges terminating in a plane coincident with the plane of the directly heated plate.

2. A heating attachment for stoves comprising a directly heated plate and an indirectly heated plate arranged at different levels, an inclined heat deflecting wall connecting said plates, a flame enveloping flange carried by and depending from the central portion of said directly heated plate and having a constricted outlet arranged beneath said inclined connecting wall, and a valve for said outlet.

3. A heating attachment for gas stoves comprising a directly heated plate and an indirectly heated plate arranged at different levels, an inclined heat deflecting wall connecting said plates, and a depending flame enveloping flange carried by the underside of said directly heated plate and having a constricted heat conducting outlet passage, a plurality of air nozzles carried by said flange opposite said outlet passage and projecting radially therefrom into the flame chamber formed by said depending flange.

4. A heating attachment for gas stoves comprising a directly heated plate, and an indirectly heated plate arranged at different levels, an inclined wall connecting said plate members, side wall members depending from said indirectly heated plate, an end wall having draft openings also depending from said indirectly heated plate and connecting the ends of said side wall members, and coöperating therewith to provide a heat retarding chamber, and a depending flame enveloping flange carried by said directly heated plate member.

5. A heating attachment for gas stoves comprising a directly heated flat plate member, an indirectly heated plate member arranged at a higher level than said directly heated plate member, an inclined wall connecting said plate members, side wall members depending from said indirectly heated plate, an end wall having draft openings connecting the ends of said side wall members and coöperating therewith to provide a heat retarding chamber, a flame enveloping member carried by said directly heated plate member and having a constricted heat conducting passage disposed beneath said inclined wall, and also having a plurality of air nozzles projecting radially into the flame chamber formed by said member.

In testimony whereof I hereunto affix my signature in the presence of two witnesses.

WILLIAM SPENCER.

Witnesses:
C. P. ALLEN, Jr.,
IDA F. STEHR.

Copies of this patent may be obtained for five cents each, by addressing the "Commissioner of Patents, Washington, D. C."